(12) United States Patent
Lee et al.

(10) Patent No.: US 8,946,133 B2
(45) Date of Patent: Feb. 3, 2015

(54) METHOD AND COMPOSITION FOR CURING LOST CIRCULATION

(75) Inventors: Jesse Lee, Paris (FR); Nikhil Shindgikar, Paris (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 655 days.

(21) Appl. No.: 13/054,605

(22) PCT Filed: Jul. 28, 2009

(86) PCT No.: PCT/EP2009/005698
§ 371 (c)(1),
(2), (4) Date: Mar. 31, 2011

(87) PCT Pub. No.: WO2010/020350
PCT Pub. Date: Feb. 25, 2010

(65) Prior Publication Data
US 2011/0183871 A1    Jul. 28, 2011

(30) Foreign Application Priority Data
Aug. 18, 2008  (EP) .................................. 08290781

(51) Int. Cl.
| | | |
|---|---|---|
| *C09K 8/035* | (2006.01) | |
| *C09K 8/487* | (2006.01) | |
| *C09K 8/42* | (2006.01) | |
| *C09K 8/12* | (2006.01) | |
| *C09K 8/32* | (2006.01) | |
| *C09K 8/40* | (2006.01) | |

(Continued)

(52) U.S. Cl.
CPC ... *C09K 8/12* (2013.01); *C09K 8/32* (2013.01); *C09K 8/40* (2013.01); *C09K 8/487* (2013.01); *C09K 8/516* (2013.01); *E21B 21/003* (2013.01); *C09K 2208/08* (2013.01)
USPC ........... 507/261; 507/117; 507/136; 507/219; 507/266; 507/269; 523/130

(58) Field of Classification Search
None
See application file for complete search history.

(56) References Cited

U.S. PATENT DOCUMENTS

| | | |
|---|---|---|
| 2,836,555 A | 5/1958 | Armentrout |
| 3,898,165 A | 8/1975 | Ely et al. |

(Continued)

FOREIGN PATENT DOCUMENTS

| | | |
|---|---|---|
| EP | 1284248 | 8/2008 |
| WO | 94/28085 | 12/1994 |

(Continued)

OTHER PUBLICATIONS

E.D. Klug, "Some properties of water-soluble hydroxyalkyl celluloses and their derivatives," Journal of Polymer Science C., vol. 36, 1971 pp. 491-508.

(Continued)

*Primary Examiner* — John J Figueroa
(74) *Attorney, Agent, or Firm* — Michael Dae

(57) ABSTRACT

A composition made of fibers and a material able to exhibit reverse solubility has utility for treating subterranean wells. The composition may used to cure lost circulation. The composition may be added to drilling fluids, spacer fluids or cement slurries. As the fluid temperature increases in a well, the reverse solubility material may precipitate and migrate to the fibers, causing the fibers to stick to each other and form a network, thereby forming a barrier that reduces further egress of treatment fluid from the wellbore.

12 Claims, 1 Drawing Sheet

(51) Int. Cl.
*C09K 8/516* (2006.01)
*E21B 21/00* (2006.01)

(56) References Cited

U.S. PATENT DOCUMENTS

| | | | |
|---|---|---|---|
| 4,002,171 | A | 1/1977 | Taft |
| 4,040,967 | A | 8/1977 | Nimerick et al. |
| 4,118,538 | A | 10/1978 | Balland |
| 4,542,791 | A | 9/1985 | Drake et al. |
| 5,464,545 | A | 11/1995 | Isharani et al. |
| 5,509,913 | A | 4/1996 | Yeo |
| 5,782,300 | A | 7/1998 | James et al. |
| 5,969,052 | A | 10/1999 | Mumick et al. |
| 6,206,102 | B1 * | 3/2001 | Pusch et al. ............... 166/305.1 |
| 2003/0236171 | A1 | 12/2003 | Nguyen et al. |
| 2005/0194141 | A1 * | 9/2005 | Sinclair et al. ............. 166/280.2 |
| 2006/0035790 | A1 * | 2/2006 | Okell et al. .................. 507/269 |
| 2006/0157244 | A1 | 7/2006 | Reddy et al. |
| 2008/0119374 | A1 * | 5/2008 | Willberg et al. ............. 507/209 |
| 2009/0023614 | A1 * | 1/2009 | Sullivan et al. ............. 507/214 |
| 2009/0200033 | A1 * | 8/2009 | Kakadjian et al. ......... 166/305.1 |

FOREIGN PATENT DOCUMENTS

| | | |
|---|---|---|
| WO | 96/40599 | 12/1996 |
| WO | 2004/101704 | 5/2004 |

OTHER PUBLICATIONS

International Search Report for the equivalent PCT patent application No. PCT/EP2009/005698 issued on Nov. 12, 2009.

* cited by examiner

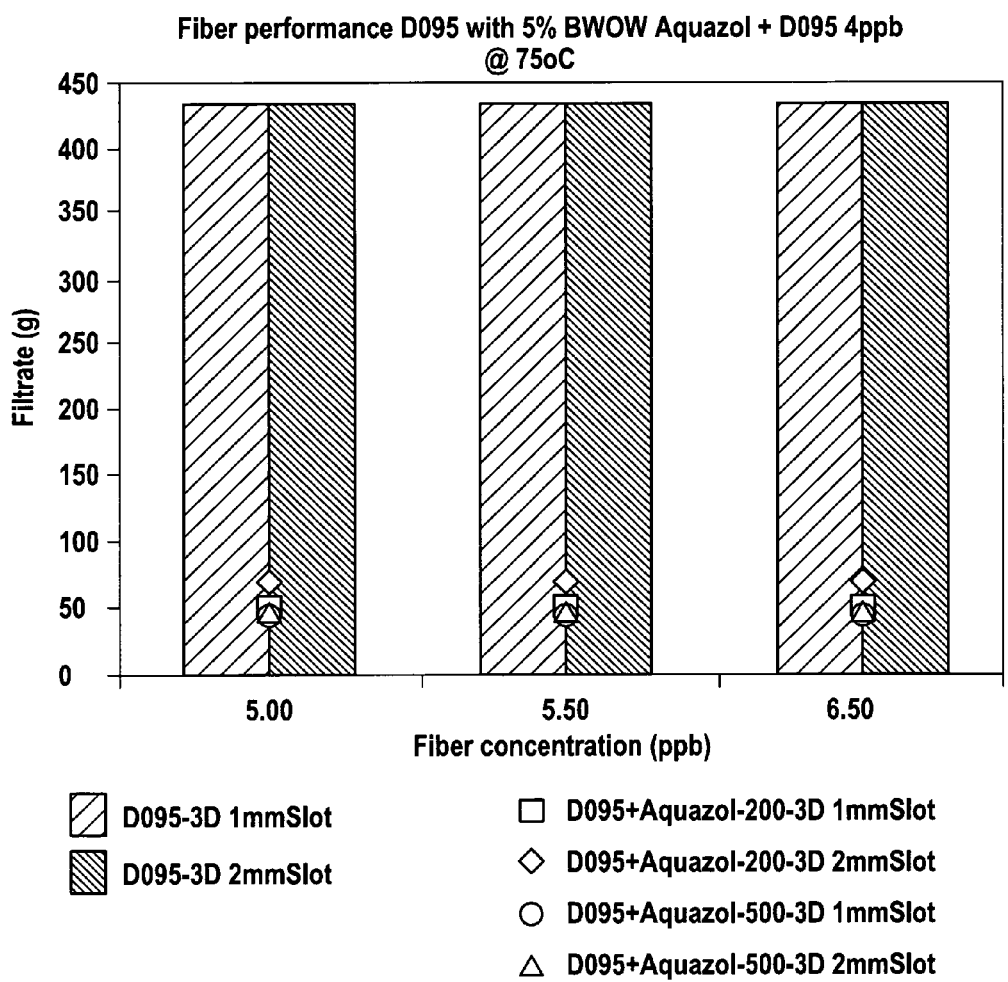

METHOD AND COMPOSITION FOR CURING LOST CIRCULATION

BACKGROUND OF THE INVENTION

The statements in this section merely provide background information related to the present disclosure and may not constitute prior art.

The present invention broadly relates to well treating. More particularly the invention relates to a composition designed to cure lost circulation in general, including cementing, drilling, completion and related method for curing lost circulation in a well, such as for instance oil or gas well.

Cement in oil and gas wells is placed in the annular gap between the drilled formation and the steel casing. Its primary main function is to prevent any fluid communication between the drilled formations to provide long-term zonal isolation. Lost circulation is a common problem encountered during drilling and cementing, which accounts for significant amount of non-producing time. Many prior art's products and techniques have been developed to solve this problem. One of the most practiced techniques is to add conventional loss circulation material (LCM) to the drilling fluids, cement slurries or pills. Recently, the use of well-defined fibers has become popular due to its superior performance, and has been used successfully with drilling fluids and cement slurries. Patent applications WO2004101704, US20060157244 and patents U.S. Pat. No. 5,782,300, EP1284248 disclose such systems. Combination with other granular material was also tested (reference can be found in scientific papers from Society of Petroleum Engineers, SPE73791 and SPE54323).

Pills, fibrous materials and conventional LCM are widely used to cure lost circulation. They often are used together to improve the overall efficiency. Higher solid or fiber contents often times perform better in sealing the lost zones. However, the concentrations for these added materials must not exceed the maximum values governed by operations and equipments. For example, high concentrations of fiber will render the treatment system unpumpable and risk choking the pumps and plugging the downhole assemblies. As such, there is a need to solve this dilemma and to improve the performance of fibers and LCM without incorporating more solid materials. For this reason, it is important to develop a new technology with improved fiber performance and excellent loss circulation properties without necessarily increasing fiber concentration.

SUMMARY OF THE INVENTION

The invention discloses a system for use in a well, comprising fibers and a material able to exhibit reverse solubility. The material can be a reverse-water-solubility polymer. Preferably, the system comprises fibers, and a material able to exhibit reverse solubility and a second material able to stick fibers in a network when activated. By activation it is meant that the material which has no or little adhesive property becomes adhesive when subjected to an activation which can be of any type as mechanical (stress), chemical (pH) or physical (temperature). Preferably, the material is activated by change of temperature and/or pH.

The fibers can be: metallic amorphous fibers, metallic non-amorphous fibers, glass fibers, carbon fibers, polymeric fiber (polypropylene, novoloid, glass, polylactic resin) or a mixture thereof. The system of the invention can be used with a base fluid made of water preferably with a hydraulic cement or with a base fluid made of oil.

According to another aspect of the invention a method for treatment in a well is disclosed, the method comprising the steps of: pumping in the well a composition made of fibers and a material able to exhibit reverse solubility; and allowing the composition to form the network in the well by activating the sticking. The method is preferably used with systems as disclosed previously.

The method applies advantageously to cure lost circulation of a zone in the well, so the method comprises further the step of drilling the well and the composition forms the network in the vicinity of the zone.

The method can be used with a hydraulic cement added to the composition, or with the composition used as a drilling fluid for the drilling step, or as a spacer. Drilling fluid can be oil-based mud or water-based mud.

BRIEF DESCRIPTION OF THE DRAWINGS

Further embodiments of the present invention can be understood with the appended drawings:

FIG. 1 shows the system according to the invention for the improved efficiency in terms of plugging the fluid.

DETAILED DESCRIPTION

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein may also comprise some components other than those cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range.

This invention describes the utilization of materials that exhibit reverse solubility; by reverse solubility, it has to be understood in the present context that the material is completely soluble below certain threshold temperatures and then precipitate or phase separate from the main fluid systems when surrounding temperatures exceed the threshold. The thus separated materials can be used to improve solid contents in-situ and/or provide binding property to agglomerate fibers and LCM together to improve the effectiveness of sealing the lost zone. There are many polymeric materials exhibit reverse solubility or cloud points, for example, the EOPO co-polymers.

The RWS (reverse-water-solubility) polymers utilized in the present invention contain water-soluble block segments which become less soluble above the cloud point. Without being bound by any theory, the inventors believe that this occurs because the block segment loses its water of hydration. Polymers containing poly(oxyalkylene) and/or poly-oxazoline which exhibit reverse water solubility can be utilized in the present invention. In addition to the poly(oxyalkylene) or poly-oxazoline, the polymers utilized in the present invention can contain linking groups which connect the poly(oxyalkylene) or poly-oxazoline. These linking groups include, but are not limited to, polyester, polyamide, polycarbonate, polyacrylate and polyurethane and mixtures thereof. The resulting polymers can be linear or branched. In a preferred embodiment, the RWS material is chosen from the group consisting of polymers containing poly(oxyalkylene) or polyoxazoline and mixtures thereof.

The RWS polymers utilized in the present invention include any reverse-water-soluble polymer that is at least 1% soluble in water at 20° C. and has a cloud point (at 1% actives) that is greater than 20° C. and less than 60° C. Linear or branched poly(oxyethylene) containing polyurethanes with the above solubility and cloud point properties are preferred.

An especially useful class of RWS polymers is the poly (oxyethylene)-poly(oxypropylene) adducts of poly-isocyanates. This class of RWS polymer is represented by formula (I):

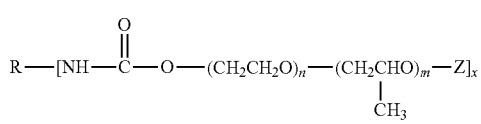

wherein R is the aliphatic or aromatic residue of a reactant containing 3 or more isocyanate reactive groups; each Z is independently hydrogen, $C_1$-$C_8$-alkyl or an additional R group; X is 3 or greater and the sum of m+n is 6 or greater; with the proviso that there are enough poly(oxyethylene) residues to make the polymer soluble at 1% actives in water at room temperature.

In the instance when Z is an additional R group, the poly (oxyethylene)/poly(oxypropylene) block segments are, for example capped with another polyisocyanate where the additional isocyanate groups are reversibly blocked.

Compounds of formula (I) are obtained by the reaction of a polyisocyanate containing 3 or more —NCO groups per molecule with a mono-alcoholic-ether of a polyalkylene glycol (such as the product resulting from the addition of ethylene/oxide and/or propylene oxide to an alcohol).

Examples of reactants containing 3 or more reactive isocyanate groups which form the residue R are polyphenylene polyisocyanate and hexamethylene-diisocyanate trimer. Polyphenylene polyisocyanate is represented by formula II wherein y is 3 or greater. Hexamethylene-diisocyanate trimer is represented by formula (III):

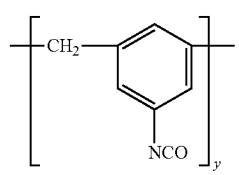

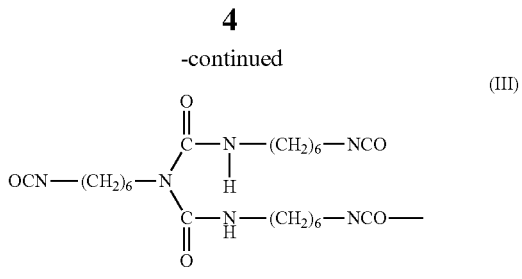

RWS polymers of formula (I) are preferably those in which x is 3 to 30, m is 0 to 100 and n is 5 to 500. Z is preferably $C_1$-$C_8$-alkyl and is most preferably butyl.

Poly(oxyethylene)-poly(oxypropylene) adducts of formula (I) wherein Z is butyl are known as thermosensitizers for aqueous dye dispersions which thermo-coagulate dispersed dye particles to inhibit their migration during textile drying operations: Such alkoxylated-polyisocyanates are commercially available as MODAREZ (Societe' Protex-distributed in the U.S. by Synthron).

The RWS is a trigger for improving sealing/plugging efficiency of lost circulation systems. This class of material, under formation temperature, increase solid content and can also work as a binder to facilitate the formation of agglomerates of LCM solids and/or fibers. This binding property can also improve the mechanical strength of the agglomerates and thus withstand higher differential pressure.

The RWS materials can be dissolved in the base fluids systems, since the majority of them are non-ionic and inert polymers; therefore, we do expect broad compatibility with existing lost circulation chemistry and systems.

Current invention is for use within a well in any type of fluids that are pumpable. Preferably, the invention can be used in well treatments in conjunction with water-based mud, oil-based mud, spacer, or cement slurries . . . . The primary application is for curing lost circulation; however the technique can be expanded to other wellbore treatment such as gravel packing, proppant flowback control, wellbore consolidation and others. In this way, sticky material facilitates the formation of impermeable barriers, which stops fluid from losing into the fractures or the cracks of formation in interest. To form the impermeable barrier, insoluble solid additives in the wellbore service fluids need to physically or chemically support each other and adhere to the surface of the fractures. By insoluble solid additives it is meant solid additives which remain insoluble at the downhole conditions. The introduction of the RWS polymers improves the efficiency of forming the barriers, and also strengthens the adhesion to the fracture surfaces. This subsequently leads to better efficiency in regards to curing lost circulation.

For instance, fibers are commonly used during the well treatment for solving the lost circulation problem. Those fibers are generally mineral fibers, as glass fiber, carbon fiber or metallic fiber made of amorphous or non-amorphous metal. Also polymeric fibers can be used.

In another aspect, the system is made of fibers, RWS polymer and a material able to stick said fibers in a network when activated. In the broadest sense, sticky properties could come from the fibers directly or can be introduced as an additional material. For example, one could use fiber made of or coated with the material that has adhesive properties when activated. Also, in another embodiment, these adhesive materials can be added and mixed with conventional fibers. Alternatively, there exists other possible combination, as long as one of the components possesses adhesive properties.

Example

Different compositions containing D95 (same as D095) which is a fiber available from Schlumberger under the tradename CemNET® and/or Aquazol which is a poly-2-ethyl-2-oxazoline available from ISP (International Specialty Products) were tested. FIG. 1 shows the behavior of different compositions:

(1) D95-3D 1 mm slot: D95 fiber only, no RWS, the plugging efficiency was tested on a 3-dimensional slot that had a 1 mm opening. The plot shows that the filtrate, in other words, the amount of fluid passed through the 1 mm opening is 430 g. Accordingly, most, if not all, the fluid was lost.

(2) D95-3D 2 mm slot: same as above, except that the opening was 2 mm in width.

(3) D95-Aquazol-200-3D 1 mm slot: same as test (1), but Aquazol 200, a RWS, was added the fluid at the concentration of 3 wt %. Aquazol 200 is a poly-2-ethyl-oxazoline polymer, and 200 is the molecular weight of this polymer corresponding to 200 kDa. The 3D 1 mm slot, again, means the test was conducted on a 3D slot with 1 mm of opening. The result showed a significant improvement on reducing the amount of filtrate passing through the 1 mm slot (~50 g)

(4) D95-Aquazol-200-3D 1 mm slot: same as (3), except that the width of the opening was 2 mm.

(5) D95-Aquazol-500-3D 1 mm slot: same as (3), the 500 means the molecular weight of this Aquazol is around 500 kDa.

(6) D95-Aquazol-500-3D 2 mm slot: same as (5), but tested on 2 mm opening.

The results for test (3) to (6) showed significant reduction of filtrate that passed through the opening of the 3D slot. It is apparent that the addition of Aquazole as a RWS material allows a phase separation above threshold temperature followed by an increase in the solid content and a sticking of the fibers together was observed.

In fact, the inventors surprisingly observed that the incorporation of 5% Aquazol (poly-oxazoline) into a 12 ppb (34.26 g/L) WBM with 4 ppb (11.42 g/L) of fibers demonstrates the improved efficiency in terms of plugging the fluid loss cell, which is defined by the amount of filtrate collected. Whereas, without Aquazol, fibers along did not provide any fluid loss control (430 ml of filtrate indicates total loss).

The invention claimed is:

1. A method for treating a subterranean well, comprising:
   pumping in the well a composition made of fibers and a material able to exhibit reverse-solubility, wherein the material is at least 1% soluble in water at 20° C. and has a cloud point that is higher than 20° C. and lower than 60° C., the material comprising poly(oxy)alkylene or poly-oxazoline and mixtures thereof; and
   allowing the composition to form a network in a well by activating the material able to exhibit reverse solubility wherein, when activated, the material able to exhibit reverse solubility also exhibits sticking properties.

2. The method of claim 1, wherein the composition further comprises a second material able to stick fibers in a network when activated.

3. The method of claim 1, applied to cure lost circulation of a zone in a well, the method further comprising the step of drilling the well and wherein the composition forms the network in the vicinity of the zone.

4. The method of claim 1, wherein a hydraulic cement is added to the composition.

5. The method of claim 3, wherein the composition is used as a drilling fluid for the drilling step.

6. The method of claim 5, wherein the drilling fluid is oil-based mud.

7. The method of claim 5, wherein the drilling fluid is water-based mud.

8. The method of claim 1, wherein the composition is a spacer.

9. A method for curing lost circulation in a well, comprising:
   pumping in the well a composition made of fibers and a material able to exhibit reverse-solubility, wherein the material is at least 1% soluble in water at 20° C. and has a cloud point that is higher than 20° C. and lower than 60° C., the material comprising poly(oxy)alkylene or poly-oxazoline and mixtures thereof; and
   allowing the composition to form the network in a well by activating the material able to exhibit reverse solubility wherein, when activated, the material able to exhibit reverse solubility also exhibit sticking properties.

10. The method of claim 9, wherein a hydraulic cement is added to the composition.

11. The method of claim 9, wherein the composition is used during drilling.

12. The method of claim 9, wherein the composition is a spacer.

* * * * *